United States Patent Office 3,449,363
Patented June 10, 1969

3,449,363
3-SUBSTITUTED 4-TRIFLUOROMETHYL INDOLES
Ruddy Littell, Rivervale, and George Rodger Allen, Jr., Old Tappan, N.J., assignors to American Cyanamid Company, Stamford, Conn., a corporation of Maine
No Drawing. Filed Dec. 22, 1966, Ser. No. 603,771
Int. Cl. C07d 27/56, 27/62; A61k 27/00
U.S. Cl. 260—326.13
8 Claims

ABSTRACT OF THE DISCLOSURE

Novel trifluoromethylindoles having a variety of substituents in the 3-position; lower alkyl in the 2-position; hydrogen or lower alkyl in the 1-position, and hydroxyl or lower alkoxy in the 5-position are described. The novel compounds are prepared starting with, for example, 2-trifluoromethyl-1,4-benzoquinone which on treatment with an alkyl 3-amino-crotonate produces the corresponding indole-3-carboxylic acid esters. Other derivatives can be prepared from the latter compounds. The compounds have analgesic activity and are useful as intermediates in the preparation of other biologically active indoles.

---

The indoles of the present invention are useful as intermediates in the preparation of indoles described and claimed in copending application Ser. No. 603,772, filed Dec. 22, 1966.

This invention relates to new organic compounds, and more particularly, it relates to novel trifluoromethylindoles of the formula:

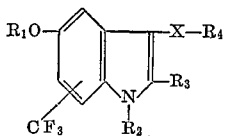

wherein $R_1$ and $R_2$ are selected from the group consisting of hydrogen and lower alkyl; $R_3$ is lower alkyl; $R_4$ is selected from the group consisting of lower alkoxy, amino, lower alkylamino, di-lower alkylamino, polymethyleneimino, lower alkyl polymethyleneimino, alkanopolymethyleneimino, mono-unsaturated polymethyleneimino, oxapolymethyleneimino and lower alkenylamino; and X is a divalent radical selected from the group consisting of

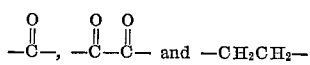

This invention also includes the pharmaceutically acceptable acid addition salts of those compounds wherein such a salt forms on the nitrogen group present.

The compounds of this invention are, in general, crystalline solids having characteristic melting points and absorption spectra. They are appreciably soluble in many organic solvents such as lower alkanols, acetone, ethyl acetate, and the like. They are, however, generally insoluble in water.

The novel 4-trifluoromethylindoles of this invention are also useful as intermediates in the preparation of biologically active 3-substituted-5-loweralkoxy alkylindoles as is set forth in greater detail in the copending application referred to above.

The novel trifluoromethylindoles of the present invention may be readily prepared as set forth in the following reaction scheme:

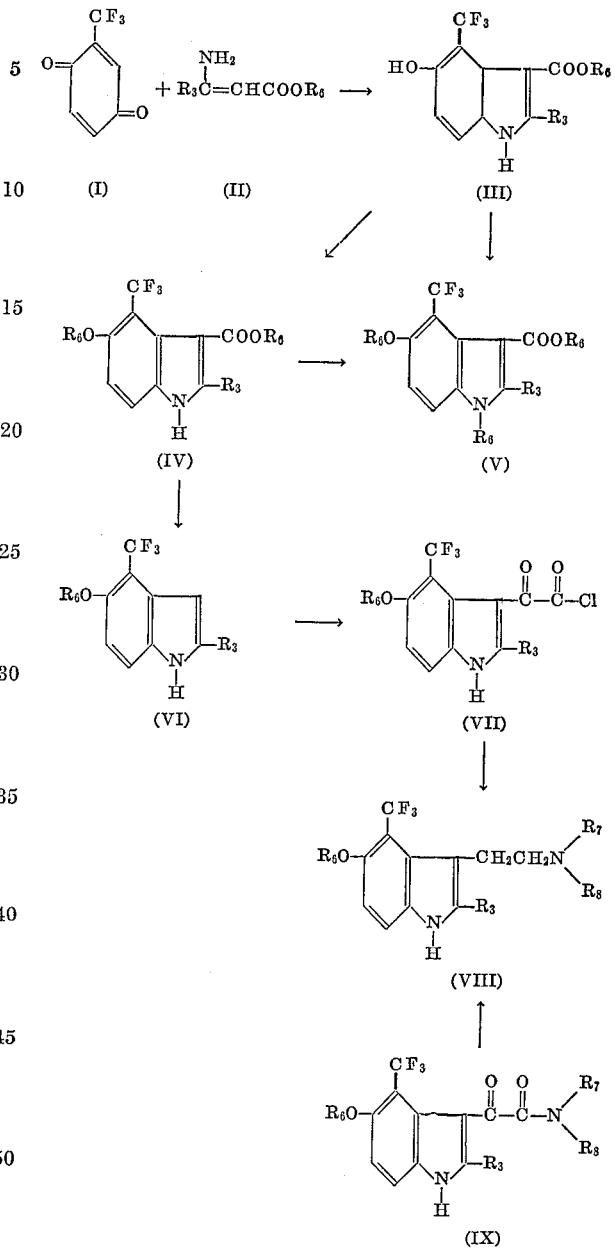

wherein $R_3$ is defined as hereinbefore; $R_6$ is lower alkyl; $R_7$ is a member of the group consisting of hydrogen, lower alkyl and lower alkenyl; $R_8$ is a member of the group consisting of hydrogen, lower alkyl, lower alkenyl; and $R_7$ and $R_8$ taken together with N(itrogen) is a member of the group consisting of polymethyleneimino, lower alkyl polymethyleneimino, mono-unsaturated polymethyleneimino, and oxapolymethyleneimino. Thus, the indole system is generated by condensation of 2-trifluoromethyl-1,4-benzoquinone (I) with an alkyl 3-aminocrotonate (II). The aminocrotonate employed in this reaction may be selected from the following: methyl 3-aminocrotonate; ethyl 3-aminocrotonate; tert-butyl 3-aminocrotonate;

ethyl 3-amino-2-pentenoate; ethyl 3-amino-2-hexenoate and the like. The indole (III), which results from the condensation of (I) and (II), may be converted into other compounds of this invention. Thus, treatment of (II) with a molar equivalent of an alkylating agent in the presence of a base gives the 5-lower alkoxy derivative (IV). When an excess of the alkylating agent is employed, alkylation on nitrogen also occurs to give the 1-alkyl derivative (V). Alternatively, the oxygen-alkylated derivative (IV) may be converted into the N-alkyl derivative (V) using an appropriate alkylation procedure. Suitable alkylating agents are, for example, the lower alkyl sulfates, lower alkyl halides and lower alkyl sulfonates. Suitable bases for the alkylation reaction are the alkali metal hydroxides, carbonates, amides, etc. Particularly advantageous for the alkylation procedures is the use of lower alkyl sulfates or lower alkyl halides in conjunction with the alkali metal carbonates.

Treatment of the indole-3-carboxylic esters (IV) with a strong acid in an inert solvent results in decarbalkoxylation to give the 3-unsubstituted trifluoromethylindole (VI); particularly useful for this transformation is the use of p-toluenesulfonic acid in a solvent such as benzene, toluene, xylene and the like. Reaction of the trifluoromethylindole (VI) thus prepared with oxalyl chloride at a temperature range of about −20° C. to 25° C. in an inert organic solvent such as ether, petroleum ether, dioxane, tetrahydrofuran and the like affords the 3-indolylglyoxalyl halides (VII). Treatment of these last compounds with an amine produces the glyoxamides (IX) which on reduction with lithium aluminum hydride in an inert solvent furnishes the 3-indolylethyleneamines (VIII).

The compounds of this invention have been found to be active analgesics in antagonizing the phenyl-p-quinone (PPQ) "writhing syndrome." The compounds are tested by a modification of the method described by E. Siegmund et al., Proc. Soc. Exptl. Biol. Med. 95, 729 (1957). Briefly, the test is described as follows: Two mice are administered the test compound, orally, 30 minutes prior to the intraperitoneal injection 1 mg./kg. phenyl-p-quinone. Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes any compound that reduces the incidence of writhing to 18 or less, the compound is considered active in the PPQ test, otherwise the compound is rejected.

The invention will be described in greater detail in conjunction with the following specific examples.

EXAMPLE 1

Preparation of ethyl 5-hydroxy-2-methyl-4-trifluoromethylindole-3-carboxylate

A solution of 2.95 g. of 2-trifluoromethyl-1,4-benzoquinone and 1.95 g. of ethyl 3-aminocrotonate in 25 ml. of ethanol is heated at reflux temperature for 2 hours. The solvent is removed, and the residue is triturated with 25 ml. of hot methylene chloride. The mixture is cooled and filtered to give crystals, melting point 153–160° C. (decomposition). Several recrystallizations from acetone-hexane gives the product as crystals, melting point 174–175° C. (decomposition).

EXAMPLE 2

Preparation of t-butyl 3-aminocrotonate

A stream of ammonia gas is bubbled into 100 g. of t-butyl acetoacetate for 6 hours while the temperature is maintained at 45° C. The water which results is separated and the organic phase is distilled at 72–75° C. and 2 millimeters of mercury. The product, colorless crystals, melting point 33–35° C. is recrystallized from hexane to give melting point 37–39° C.

EXAMPLE 3

Preparation of t-butyl 5-hydroxy-2-methyl-4-trifluoromethylindole-3-carboxylate

A solution of 8.75 g. of trifluoromethylbenzoquinone and 7.85 g. of 5-butyl 3-aminocrotonate in 40 ml. of ethanol is heated at reflux temperature for 30 minutes. After the addition of 100 ml. of benzene and 40 ml. of heptane, 80 ml. of solvent is distilled from the mixture which is cooled and filtered to give a tan powder, melting point 218–220° C. (decomposition). The product may be purified by sublimation to give white crystals, melting point 225–227° C. (decomposition).

EXAMPLE 4

Preparation of t-butyl 5-methoxy-2-methyl-4-trifluoromethylindole-3-carboxylate

A solution of 10 g. of 5-hydroxy-2-methyl-4-trifluoromethylindole-3-carboxylate and 4.0 g. of dimethyl sulfate in 125 ml. of acetone containing 9.0 g. of anhydrous potassium carbonate is heated at reflux temperature for 3 hours. The solids are removed by filtration and the filtrate is evaporated. The residue is crystallized from benzene-hexane to give white needles, melting point 190–192° C. The product may be sublimed to give white crystals, melting point 188–191° C.

EXAMPLE 5

Preparation of ethyl 5-methoxy-2-methyl-4-trifluoromethylindole-3-carboxylate

A solution of 574 mg. of ethyl 5-hydroxy-2-methyl-4-trifluoromethylindole-3-carboxylate and 265 mg. of dimethyl sulfate in 10 ml. of acetone containing 600 mg. of anhydrous potassium carbonate is stirred at room temperature for 20 hours. The solids are removed by filtration and the filtrate is evaporated. The residue is dissolved in benzene, washed with water, and evaporated. The residue is crystallized from ether-hexane to give the product as white crystals melting point 197–198° C. The product may be sublimed to give white crystals, melting point 198–200° C.

EXAMPLE 6

Preparation of ethyl 5-methoxy-1,2-dimethyl-4-trifluoromethylindole-3-carboxylate A solution of 250 mg. of ethyl 5-hydroxy-2-methyl-4-trifluoromethylindole-3-carboxylate in 2 ml. of methyl iodide and 5 ml. of acetone containing 600 mg. of anhydrous potassium carbonate is heated at reflux for 4 hours. The solids are removed by filtration and the filtrate is evaporated. The residue is dissolved in benzene and the solution is washed with dilute hydrochloric acid and with water, dried and evaporated. The crude yellow solid residue is chromatographed on a 4.0 cm. silica gel Unibar using a system composed of acetic acid-acetone-methanol-benzene (5:5:20:250). The non-polar band is excised and extracted with acetone to give, upon crystallization from ether-hexane, the product as white prisms, melting point 132–134° C.

EXAMPLE 7

Preparation of 5-methoxy-2-methyl-4-trifluoromethylindole

A solution of 7.0 g. of t-butyl 5-methoxy-2-methyl-4-trifluoromethylindole-3-carboxylate and 600 mg. of p-toluene-sulfonic acid in 400 ml. of toluene is heated at reflux for 1 hour. After cooling, the purple solution is washed with water, dried with magnesium sulfate and evaporated to give a deep red oil. The oil is dissolved in ether, passed through a pad of silica gel and concentrated with n-hexane to give the product as white needles, melting point 122–125° C. (decomposition).

EXAMPLE 8

Preparation of 5-methoxy-2-methyl-4-trifluoromethylindole-3-glyoxamide

A solution of 1.0 ml. of oxalyl chloride in 10 ml. of ether is slowly added to a solution of 1.37 g. of 5-methoxy - 2 - methyl - 4 - trifluoromethylindole in 30 ml. of ether at 0° C. After standing at 0° for 16 hours, the solvents are evaporated under reduced pressure. The resulting orange powder is suspended in 100 ml. of ether and is agitated with a stream of anhydrous ammonia for one-half hour. The mixture is filtered and the residue is washed with water and dried to give 1.6 g. of yellow crystals, melting point 268–270° C. Crystallization from methanol gives the pure glyoxamide as yellow plates, melting point 274–276° C.

EXAMPLE 9

Preparation of N,2-dimethyl-5-methoxy-4-trifluoromethylindole-3-glyoxamide

A solution of 1.1 ml. of oxalyl chloride in 20 ml. of ether is added dropwise at 0° C. to a solution of 1.5 g. of 5-methoxy-2-methyl-4-trifluoromethylindole in 20 ml. of ether. The mixture is allowed to stand at 0° C. for 16 hours, then is evaporated to a tan solid. The tan intermediate is suspended in 100 ml. of ether and is agitated with a stream of anhydrous methylamine for one-half hour. The mixture is filtered, the residue is washed with water and recrystallized from methanol to give 1.55 g. of the product as white plates, melting point 287–289° C. The pure product, melting point 290–291° C. is obtained by sublimation at 180° C.

EXAMPLE 10

Preparation of 5-methoxy-N,N,2-trimethyl-4-trifluoromethylindole-3-glyoxamide

A solution of 2.0 ml. of oxalyl chloride in 20 ml. ether is added dropwise at 0° C. to a solution of 2.0 g. of 5-methoxy-2-methyl-4-trifluoromethylindole in 20 ml. of ether. The mixture is stirred at 0° for 1 hour then concentrated with a stream of argon and filtered to give the intermediate glyoxalyl chloride as an orange powder.

The orange intermediate is suspended in 150 ml. of ether and is agitated with a stream of anhydrous dimethylamine for one-half hour. The mixture is filtered and the residue is washed with water to give 2.27 g. of dimethylglyoxamide as pale yellow crystals, melting point 208–211°. The pure product as white needles, melting point 211–212° C. is obtained by crystallization from acetone-hexane.

EXAMPLE 11

Preparation of 5-methoxy-N,N,2-trimethyl-4-trifluoromethyltryptamine

A mixture of 500 mg. of 5-methoxy-N,N,2-trimethyl-4-trifluoromethylindole hydride in 25 ml. of tetrahydrofuran is stirred at room temperature overnight. Water is added until the evolution of gas ceases. The inorganic precipitate is filtered and the filtrate is evaporated, dissolved in ether, washed with water, dried and again evaporated. The crude product, 365 mg. of pale yellow crystals, melting point 123–126°, is crystallized from ether-hexane to give the pure tryptamine as white crystals, melting point 130–131°.

EXAMPLE 12

Preparation of 5-methoxy-2-methyl-3-(1-pyrrolidineglyoxyloyl)-4-trifluoromethylindole In the manner described in Example 8 treatment of 5-methoxy - 2 - methyl - 4 - trifluoromethylindole with oxalyl chloride in ether is productive of 5-methoxy-2-methyl-4-trifluoromethyl-3-indolylglyoxalyl chloride. Reaction of this compound with pyrrolidine gives the product, melting point 227–229° C.

EXAMPLE 13

Preparation of 3-(5-methoxy-2-methyl-4-trifluoromethyl-3-indoleglyoxyloyl)-3-azabicyclo(3.2.2)nonane In the manner described in Example 8 treatment of 5-methoxy - 2 - methyl - 4 - trifluoromethylindole with oxalyl chloride in ether is productive of 5-methoxy-2-methyl-4-trifluoromethyl-3-indolylglyoxalyl chloride. Reaction of this compound with 3-azabicyclo(3.2.2)nonane produces crystals, melting point 262–264° C.

EXAMPLE 14

Preparation of 5-methoxy-2-methyl-3-(4-morpholineglyoxyloyl)-4-trifluoromethylindole In the manner described in Example 8 treatment of 5-methoxy - 2 - methyl - 4 - trifluoromethylindole with oxalyl chloride in ether is productive of 5-methoxy-2-methyl-4-trifluoromethyl-3-indolylglyoxalyl chloride. Reaction of this compound with morpholine gives the product.

EXAMPLE 15

Preparation of 1-(5-methoxy-2-methyl-4-trifluoromethyl-3-indoleglyoxyloyl)-3-pyrroline In the manner described in Example 8 treatment of 5-methoxy-2-methyl-4-trifluoromethylindole with oxalyl chloride in ether is productive of 5-methoxy-2-methyl-4-trifluoromethyl-3-indolylglyoxalyl chloride. Reaction of this compound with 3-pyrroline gives the product.

EXAMPLE 16

Preparation of N-methallyl-5-methoxy-2-methyl-4-trifluoromethylindole-3-glyoxamide In the manner described in Example 8, treatment of 5-methoxy - 2 - methyl - 4 - trifluoromethylindole with oxalyl chloride in ether is productive of 5-methoxy-2-methyl-4-trifluoromethyl-3-indolylglyoxalyl chloride. Reaction of this compound with methallylamine produces crystals of the product.

EXAMPLE 17

Preparation of 5-methoxy-2-methyl-3-(4-methyl-1-piperidineglyoxyloyl)-4-trifluoromethylindole In the manner described in Example 8, treatment of 5-methoxy - 2 - methyl - 4 - trifluoromethylindole with oxalyl chloride in ether is productive of 5-methoxy-2-methyl-4-trifluoromethyl-3-indolylglyoxalyl chloride. Reaction of this compound with 4-methylpiperidine gives the product.

EXAMPLE 18

Preparation of 5-methoxy-2-methyl-3-[2-(1-pyrrolidinyl)ethyl]-4-trifluoromethylindole By the procedure of Example 11, 5-methoxy-2-methyl-3-(1-pyrrolidineglyoxyloyl)-4-trifluoromethylindole is reduced with lithium aluminum hydride in tetrahydrofuran to yield crystals, melting point 121–123° C.

What is claimed is:

1. A trifluoromethylindole of the formula:

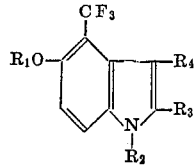

wherein $R_1$ and $R_2$ are selected from the group consisting of hydrogen and lower alkyl; $R_3$ is lower alkyl and $R_4$ is selected from the group consisting of lower alkoxycarbonyl and β dilower alkylaminoethyl.

2. The trifluoromethylindole according to claim 1: lower alkyl ester of 5-hydroxy-2-methyl-4-trifluoromethylindole-3-carboxylic acid.

3. The trifluoromethylindole according to claim 1: ethyl 5 - hydroxy - 2 - methyl - 4 - trifluoromethylindole-3-carboxylate.

4. The trifluoromethylindole according to claim 1: tert - butyl 5 - hydroxy - 2 - methyl - 4 - trifluoromethylindole-3-carboxylate.

5. The trifluoromethylindole according to claim 1: tert - butyl 5 - methoxy - 2 - methyl - 4 - trifluoromethylindole-3-carboxylate.

6. The trifluoromethylindole according to claim 1: ethyl 5 - methoxy - 2 - methyl - 4 - trifluoromethylindole-3-carboxylate.

7. The trifluoromethylindole according to claim 1: ethyl 5 - methoxy - 1,2 - dimethyl - 4 - trifluoromethylindole-3-carboxylate.

8. The trifluoromethylindole according to claim 1: 5-methoxy-N,N,2-trimethyl-4-trifluoromethyltryptamine.

References Cited
UNITED STATES PATENTS 2,930,797  3/1960  Anthony et al. ____ 260—326.13

OTHER REFERENCES

Yale: J. Med. & Pharm. Chem., vol. 1 (1959) pp. 121, 122 and 131 relied on.

ALEX MAZEL, *Primary Examiner.*

J. A. NARCAVAGE, *Assistant Examiner.*

U.S. Cl. X.R.

260—326.14, 326.15, 336.16, 999